US010293937B2

(12) United States Patent
Welsh et al.

(10) Patent No.: US 10,293,937 B2
(45) Date of Patent: May 21, 2019

(54) UNMANNED AERIAL VEHICLE PROTECTIVE FRAME CONFIGURATION

(71) Applicant: Amazon Technologies, Inc., Seattle, WA (US)

(72) Inventors: Ricky Dean Welsh, Seattle, WA (US); Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/849,374

(22) Filed: Dec. 20, 2017

(65) Prior Publication Data

US 2018/0099745 A1 Apr. 12, 2018

Related U.S. Application Data

(63) Continuation of application No. 14/557,403, filed on Dec. 1, 2014, now Pat. No. 9,889,930.

(Continued)

(51) Int. Cl.
*B64C 27/00* (2006.01)
*B64C 39/02* (2006.01)
*A63H 27/00* (2006.01)

(52) U.S. Cl.
CPC ........... *B64C 39/024* (2013.01); *A63H 27/12* (2013.01); *B64C 2201/027* (2013.01); *B64C 2201/042* (2013.01); *B64C 2201/108* (2013.01)

(58) Field of Classification Search
CPC . B64C 39/024; B64C 27/22; B64C 2201/108; B64C 2201/042;

(Continued)

(56) References Cited

U.S. PATENT DOCUMENTS 3,979,658 A 9/1976 Foster
5,890,441 A 4/1999 Swinson et al.

(Continued)

FOREIGN PATENT DOCUMENTS

CN 201932359 U 8/2011
DE 102012202698 A1 8/2013

(Continued)

OTHER PUBLICATIONS

Ferrell et al. "Dynamic Flight Modeling of a Multi-mode Flying Wing Quadrotor Aircraft".*

(Continued)

*Primary Examiner* — Assres H Woldemaryam
(74) *Attorney, Agent, or Firm* — Athorus, PLLC

(57) ABSTRACT

This disclosure describes a configuration of an unmanned aerial vehicle (UAV) that includes a frame that provides both structural support for the UAV and protection for foreign objects that may come into contact with the UAV. The UAV may have any number of lifting motors. For example, the UAV may include four lifting motors (also known as a quad-copter), eight lifting motors (octo-copter), etc. Likewise, to improve the efficiency of horizontal flight, the UAV may also include one or more pushing motor and propeller assemblies that are oriented at approximately ninety degrees to one or more of the lifting motors. When the UAV is moving horizontally, the pushing motor(s) may be engaged and the pushing propeller(s) will aid in the horizontal propulsion of the UAV.

20 Claims, 8 Drawing Sheets

Related U.S. Application Data

(60) Provisional application No. 62/083,879, filed on Nov. 24, 2014.

(58) Field of Classification Search
CPC ........ B64C 2201/162; B64C 2201/062; B64C 39/00; B64C 29/00; B64C 5/06; A63H 27/12; B64D 27/08; B64D 27/26
See application file for complete search history.

(56) References Cited

U.S. PATENT DOCUMENTS

| | | | | |
|---|---|---|---|---|
| 6,293,491 | B1 | 9/2001 | Wobben | |
| 7,273,195 | B1 * | 9/2007 | Golliher | A63H 27/12 244/17.11 |
| 7,911,796 | B2 | 3/2011 | Ploeg et al. | |
| 8,322,648 | B2 | 12/2012 | Kroetsch et al. | |
| 8,485,464 | B2 | 7/2013 | Kroo | |
| 8,596,571 | B2 * | 12/2013 | Goelet | B64B 1/06 244/13 |
| 8,964,396 | B1 | 2/2015 | Dailey et al. | |
| 9,061,763 | B1 * | 6/2015 | Christensen | A63H 17/28 |
| 9,120,560 | B1 | 9/2015 | Armer et al. | |
| D751,025 | S * | 3/2016 | Howell | D12/16.1 |
| D756,842 | S * | 5/2016 | Ashjaee | D12/16.1 |
| 9,457,901 | B2 * | 10/2016 | Bertrand | A63H 27/12 |
| 2003/0085319 | A1 | 5/2003 | Wagner et al. | |
| 2009/0008499 | A1 | 1/2009 | Shaw | |
| 2009/0283629 | A1 * | 11/2009 | Kroetsch | A63H 27/12 244/17.23 |
| 2011/0042508 | A1 * | 2/2011 | Bevirt | B64C 15/00 244/12.4 |
| 2011/0127775 | A1 | 6/2011 | Bevirt | |
| 2012/0018571 | A1 * | 1/2012 | Goelet | B64B 1/005 244/30 |
| 2012/0083945 | A1 * | 4/2012 | Oakley | B64C 27/08 701/2 |
| 2013/0092799 | A1 | 4/2013 | Tian et al. | |
| 2013/0134254 | A1 | 5/2013 | Moore | |
| 2014/0032034 | A1 | 1/2014 | Raptopoulos et al. | |
| 2014/0099853 | A1 * | 4/2014 | Condon | G05D 1/0033 446/37 |
| 2014/0103158 | A1 | 4/2014 | Berry | |
| 2014/0131510 | A1 * | 5/2014 | Wang | B64C 39/024 244/17.23 |
| 2014/0217230 | A1 | 8/2014 | Helou | |
| 2014/0231582 | A1 * | 8/2014 | Headrick | B64C 27/08 244/54 |
| 2015/0175258 | A1 | 6/2015 | Lee | |
| 2015/0286216 | A1 | 10/2015 | Miwa | |
| 2016/0001878 | A1 * | 1/2016 | Lee | B64C 3/38 244/7 A |
| 2016/0068261 | A1 | 3/2016 | Niederberger | |
| 2016/0130015 | A1 | 5/2016 | Caubel et al. | |
| 2016/0207625 | A1 | 7/2016 | Judas et al. | |
| 2017/0217599 | A1 | 8/2017 | Peng et al. | |

FOREIGN PATENT DOCUMENTS

| | | | |
|---|---|---|---|
| DE | 102013104447 | A1 | 10/2014 |
| EP | 3161574 | A1 | 5/2017 |
| EP | 3265382 | A1 | 1/2018 |
| GB | 2486448 | A | 6/2012 |
| GB | 2502250 | A | 11/2013 |
| JP | 2011521833 | A | 7/2011 |
| WO | 2009144477 | A2 | 12/2009 |
| WO | 2011149544 | A1 | 12/2011 |
| WO | 2013074545 | A1 | 5/2013 |
| WO | 2013123944 | | 8/2013 |
| WO | 2014068982 | A1 | 5/2014 |
| WO | 2014106814 | A2 | 7/2014 |
| WO | 2014108026 | A1 | 7/2014 |
| WO | 2014177661 | A1 | 11/2014 |
| WO | 2014080388 | | 4/2015 |
| WO | 2015135951 | A1 | 9/2015 |
| WO | 2015200391 | A1 | 12/2015 |
| WO | 2016140987 | A1 | 9/2016 |

OTHER PUBLICATIONS

Ferrell et al. “Dynamic Flight Modeling of a Multi-Mode Flying Wing Quadrotor Aircraft”, 2013.

International Search Report and Written Opinion for International Application No. PCT/US2015/060023 dated Jan. 7, 2016.

Extended European Search Report for EP Application No. 15858801.2, dated May 28, 2018, 9 pages.

* cited by examiner

UNMANNED AERIAL VEHICLE PROTECTIVE FRAME CONFIGURATION

CROSS-REFERENCE TO RELATED APPLICATION

This application is a continuation of and claims priority to U.S. patent application Ser. No. 14/557,403, filed Dec. 1, 2014, entitled "UNMANNED AERIAL VEHICLE PROTECTIVE FRAME CONFIGURATION," and claims priority to U.S. Provisional Application 62/083,879, filed Nov. 24, 2014, entitled "UNMANNED AERIAL VEHICLE PROTECTIVE FRAME CONFIGURATION," which are incorporated herein by reference in their entirety.

BACKGROUND

Multi-propeller aerial vehicles (e.g., quad-copters, octo-copters) are becoming more common. All such vehicles require a body configuration that will support the separation of the multiple propellers, the control components, the power supply (e.g., battery), etc.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
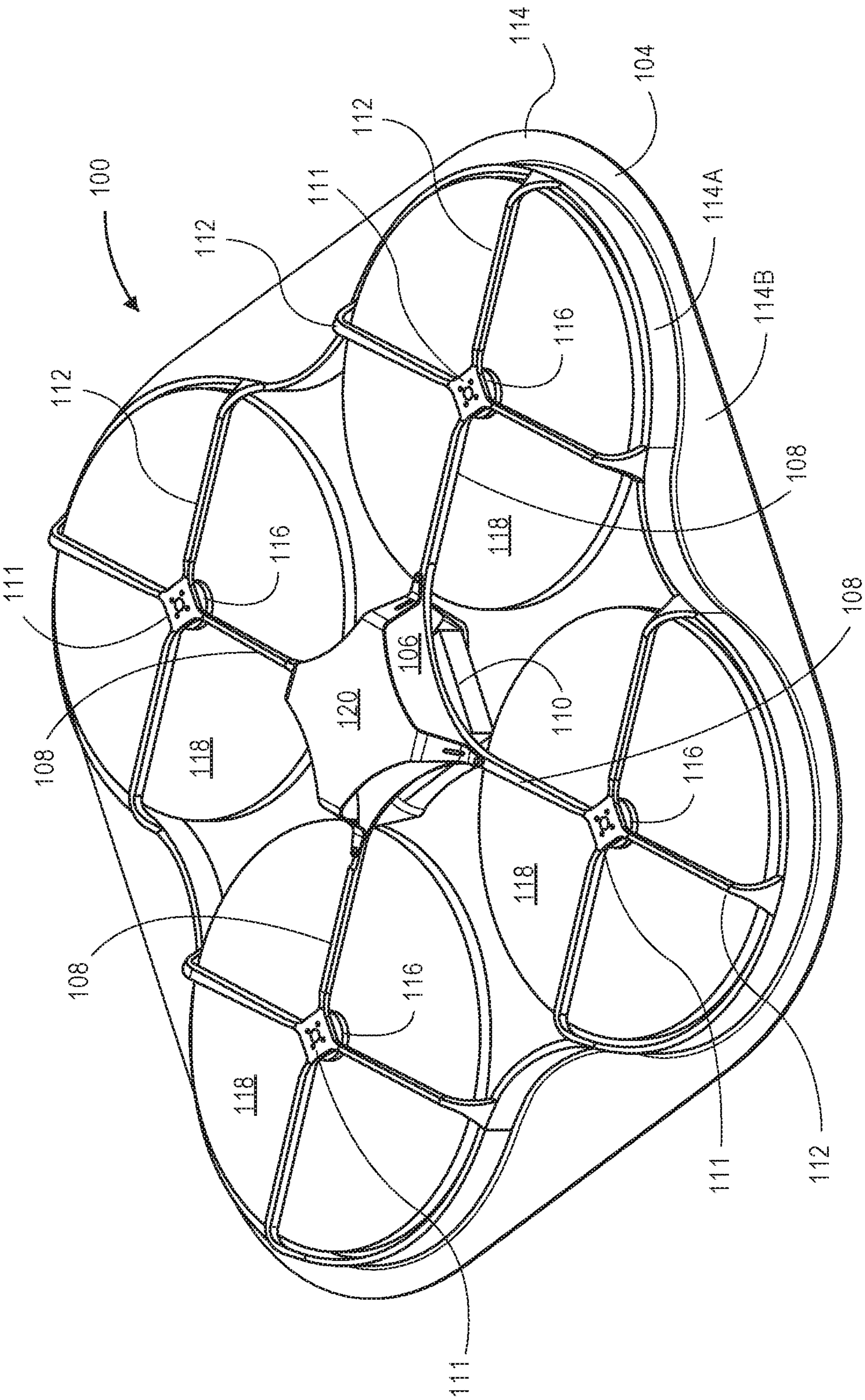
FIG. 1 depicts a view of an unmanned aerial vehicle configuration, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes a configuration of an unmanned aerial vehicle ("UAV") that includes a frame that provides structural support to the UAV and provides a protective barrier around the UAV. In one implementation, the frame may be designed to encompass the lifting motors and corresponding lifting propellers to form a protective barrier around at least a perimeter of the lifting propellers. For example, the frame may include a hub from which multiple motor arms extend. Each motor arm may extend from the hub, over the top of a lifting propeller and lifting motor and couple with or otherwise terminate into a motor mount to which the corresponding lifting motor and lifting propeller are mounted. One or more support arms may extend from each motor mount and couple with or otherwise terminate into a perimeter protective barrier that forms a perimeter of the frame and which extends around the perimeter of the lifting propellers. In some implementations, the frame may also include a permeable material (e.g., mesh, screen) that extends over the top and/or bottom of the frame to provide a protective barrier above and/or below the propellers of the UAV.

The UAV may have any number of lifting motors and corresponding lifting propellers. For example, the UAV may include four lifting motors and lifting propellers (also known as a quad-copter), eight lifting motors and lifting propellers (also known as an octo-copter), etc., each of which may be mounted to the frame at corresponding motor mounts. Likewise, to improve the efficiency of horizontal flight, the UAV may also include one or more pushing motors and pushing propellers that are oriented at approximately ninety degrees to one or more of the lifting motors and/or the frame of the UAV. When the UAV is moving horizontally, the pushing motor(s) may be engaged and the pushing propeller will aid in the horizontal propulsion of the UAV. In some implementations, the rotational speed of the lifting motors may be reduced when the pushing motor is engaged, thereby improving efficiency and reducing power consumption of the UAV. Likewise, in some implementations, the UAV may include a wing to aid in the vertical lift of the UAV while the UAV is moving horizontally.

In some implementations, the frame may be formed of a single mold or uni-body design. In other implementations, one or more components of the frame may be coupled together. In some implementations, the frame may be formed as two matching halves that are mounted or coupled together to form a single UAV frame for the UAV. To further improve the efficiency of the UAV, in some implementations, the frame (motor arms, motor mount, support arms, perimeter protection barrier) and/or other components of the UAV may be formed of one or more lightweight materials, such as carbon fiber, graphite, machined aluminum, titanium, fiberglass, etc. Regardless of the material, each of the motor arms, motor mounts, support arms, and/or perimeter protection barrier may be hollow or formed around a lightweight core (e.g., foam, wood, plastic), thereby reducing weight, increasing structural rigidity and providing a channel through which one or more wires and/or cables may be passed and/or in which other components may be housed. For example, the motor arms may include both an inner core (e.g., foam, wood, plastic) and a hollow portion. The inner core, which may be formed of foam, wood, plastic, etc., or any combination thereof, provides increased dimensionality to the motor arm and helps increase the structural integrity of the motor arm. The hollow portion, which may run along the top of the motor arm, provides a channel through which wires, such as motor control wires, may be passed.

In some implementations, the UAV may be configured so that the wires passing through the channels have multiple junctions to enable easy disassembly and/or part replacements. For example, the motor wires may be configured with multiple separable junctions. For example, the motor wires may extend from the motor and have a separable junction at or near the motor, rather than having only a single junction where the motor wires connect to the ESC. By having a separable junction for the motor wires near the motor, the motor can be easily removed and replaced without having to disassemble any other components of the UAV, access the UAV control system or remove the motor wires from the UAV.

FIG. 1 illustrates a view of a UAV 100, according to an implementation. As illustrated, the UAV 100 includes a frame 104. The frame 104 or body of the UAV 100 may be formed of any suitable material, such as graphite, carbon fiber, aluminum, titanium, etc., or any combination thereof. In this example, the frame 104 of the UAV 100 is a single carbon fiber frame. The frame 104 includes a hub 106, motor arms 108, motor mounts 111, support arms 112, and a perimeter protective barrier 114. In this example, there is a single hub 106, four motor arms 108, four motor mounts 111, twelve support arms 112 and a single perimeter protective barrier 114.

Each of the motor arms 108 extend from the hub 106 and couple with or terminate into the motor mounts 111. Lifting motors 116 are coupled to an inner side of the motor mount 111 so that the lifting motor 116 and corresponding lifting propeller 118 are within the frame 104. In one implementation, the lifting motors 116 are mounted so that the propeller shaft of the lifting motor that mounts to the lifting propeller 118 is facing downward with respect to the frame 104. In other implementations, the lifting motors may be mounted at other angles with respect to the frame 104 of the UAV 100. The lifting motors may be any form of motor capable of generating enough rotational speed with the propellers to lift the UAV 100 and any engaged payload, thereby enabling aerial transport of the payload. For example, the lifting motors may each be a FX-4006-13 740 kv multi-rotor motor, a Tiger U-11 motor, a KDE motor, etc.

Mounted to each lifting motor 116 is a lifting propeller 118. The lifting propellers 118 may be any form of propeller (e.g., graphite, carbon fiber) and of a size sufficient to lift the UAV 100 and any payload engaged by the UAV 100 so that the UAV 100 can navigate through the air, for example, to deliver a payload to a delivery location. For example, the lifting propellers 118 may each be carbon fiber propellers having a dimension or diameter of twenty-nine inches. While the illustration of FIG. 1 shows the lifting propellers 118 all of a same size, in some implementations, one or more of the lifting propellers 118 may be different sizes and/or dimensions. Likewise, while this example includes four lifting propellers, in other implementations, more or fewer propellers may be utilized as lifting propellers 118. Likewise, in some implementations, the lifting propellers 118 may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

Extending from each motor mount 111 are three support arms 112 that couple with or otherwise terminate into the perimeter protective barrier 114. The perimeter protective barrier 114 extends around the perimeter of the UAV and encompasses the lifting propellers 118. In some implementations, the perimeter protective barrier 114 may include a vertical component 114A that extends substantially downward from the support arms and approximately perpendicular to the axis of rotation of the lifting propellers 118. The vertical component 114A may be of any vertical dimension and width. For example, the vertical component 114A may have a vertical dimension of approximately three inches and a width of approximately 0.5 inches. In other implementations, the vertical dimension and/or the width may be larger or smaller. Likewise, the vertical component 114A of the perimeter protective barrier may include a core, such as a foam, wood and/or plastic core. The vertical component may be coupled to each of the support arms and extend around the outer perimeter of each propeller 118 to inhibit access to the propellers from the sides of the UAV 100.

The perimeter protective barrier 114 provides safety for objects foreign to the UAV 100 by inhibiting access to the propellers 118 from the side of the UAV 100 provides protection to the UAV 100 and increases the structural integrity of the UAV 100. For example, if the UAV 100 is traveling horizontally and collides with a foreign object (e.g., wall, building), the impact between the UAV and the foreign object will be with the perimeter protective barrier 114, rather than a propeller. Likewise, because the frame is interconnected, the forces from the impact are dissipated across the frame.

Likewise, the vertical component 114A provides a surface upon which one or more components of the UAV may be mounted. For example, one or more antennas may be mounted to the vertical component 114A of the perimeter protective barrier 114. The antennas may be used to transmit and/or receive wireless communications. For example, the antennas may be utilized for Wi-Fi, satellite, near field communication ("NFC"), cellular communication, or any other form of wireless communication. Other components, such as cameras, time of flight sensors, distance determining elements, gimbals, Global Positioning System (GPS) receiver/transmitter, radars, illumination elements, speakers, and/or any other component of the UAV 100 or the UAV control system (discussed below), etc., may likewise be mounted to the vertical component 114A of the perimeter protective barrier 114. Likewise, identification or reflective identifiers may be mounted to the vertical component to aid in the identification of the UAV 100.

In some implementations, the perimeter protective barrier 114 may also include a horizontal component 114B that extends outward, with respect to the UAV 100, from the vertical component 114A of the perimeter protective barrier 114. The horizontal component 114B may provide additional protective support for the UAV and/or any object with which the UAV 100 may come into contact. Similar to the vertical component 114A, the horizontal component 114B may or may not include a core. Likewise, the horizontal component 114B provides another surface to which one or more components (e.g., antennas, camera, sensors, GPS, range finders) may be mounted.

While the example illustrated in FIG. 1 shows a perimeter protective barrier 114 with a vertical component 114A and a horizontal component 114B, in other implementations, the perimeter protective barrier may have other configurations. For example, the perimeter protective barrier 114 may only include a vertical component 114A. Alternatively, the perimeter protective barrier may be angled (e.g., forty-five degree angle) with respect to the UAV 100, and extend from above the lifting propellers where it is coupled with the support arms 112 to below the lifting propellers 118. Such a configuration may improve the aerodynamics of the UAV 100. In other implementations, the perimeter protective barrier may have other configurations or designs.

In addition to providing protection for the UAV 100, the frame 104 provides structural support for the UAV 100. By interconnecting all of the components, hub 106, motor arms 108, motor mounts 111, support arms 112, and perimeter protective barrier 114, the resulting frame has structural stability and is sufficient to support the lifting motors, lifting propellers, a payload (e.g., container), UAV control system and/or other components of the UAV.

In some implementations, the frame 104 may also include a permeable material (e.g., mesh, screen) that extends over the top and/or lower surface of the frame to inhibit vertical access to the propellers from above or below the propellers 118. Likewise, in some implementations, one or more mounting plates 120 may be affixed to the frame 104 to provide additional surface area for mounting components to the UAV 100. The mounting plates 120 may be removably coupled to the frame 104, for example, using screws, fasteners, etc. Alternatively, the mounting plates 120 may be formed as part of the frame 104.

A UAV control system 110 is also mounted to the frame 104. In this example, the UAV control system 110 is mounted between the hub 106 and a mounting plate 120. The UAV control system 110, as discussed in further detail below with respect to FIG. 8, controls the operation, routing, navigation, communication, motor controls, and the payload engagement mechanism of the UAV 100.

Likewise, the UAV 100 includes one or more power modules (not shown). The power modules may be mounted to various locations on the frame. For example, in some implementations, four power modules may be mounted to each mounting plate 120 and/or to the hub 106 of the frame. The power module for the UAV may be in the form of battery power, solar power, gas power, super capacitor, fuel cell, alternative power generation source, or a combination thereof. For example, the power modules may each be a 6000 mAh lithium-ion polymer battery, or polymer lithium ion (Li-poly, Li-Pol, LiPo, LIP, PLI or Lip) battery. The power module(s) are coupled to and provide power for the UAV control system 110, the lifting motors 116 and the payload engagement mechanism.

In some implementations, one or more of the power modules may be configured such that it can be autonomously removed and/or replaced with another power module while the UAV is landed or in flight. For example, when the UAV lands at a location, the UAV may engage with a charging member at the location that will recharge the power module.

As mentioned above, the UAV 100 may also include a payload engagement mechanism (not shown). The payload engagement mechanism may be configured to engage and disengage items and/or containers that hold items. In this example, the payload engagement mechanism is positioned beneath and coupled to the hub 106 of the frame 104 of the UAV 100. The payload engagement mechanism may be of any size sufficient to securely engage and disengage containers that contain items. In other implementations, the payload engagement mechanism may operate as the container, in which it contains item(s). The payload engagement mechanism communicates with (via wired or wireless communication) and is controlled by the UAV control system 110.

While the implementations of the UAV 100 discussed herein utilize propellers to achieve and maintain flight, in other implementations, the UAV may be configured in other manners. For example, the UAV may include fixed wings and/or a combination of both propellers and fixed wings. For example, as discussed below with respect to FIG. 7, the UAV may utilize one or more propellers and motors to enable vertical takeoff and landing and a fixed wing configuration or a combination wing and propeller configuration to sustain flight while the UAV is airborne.

Figure 2:
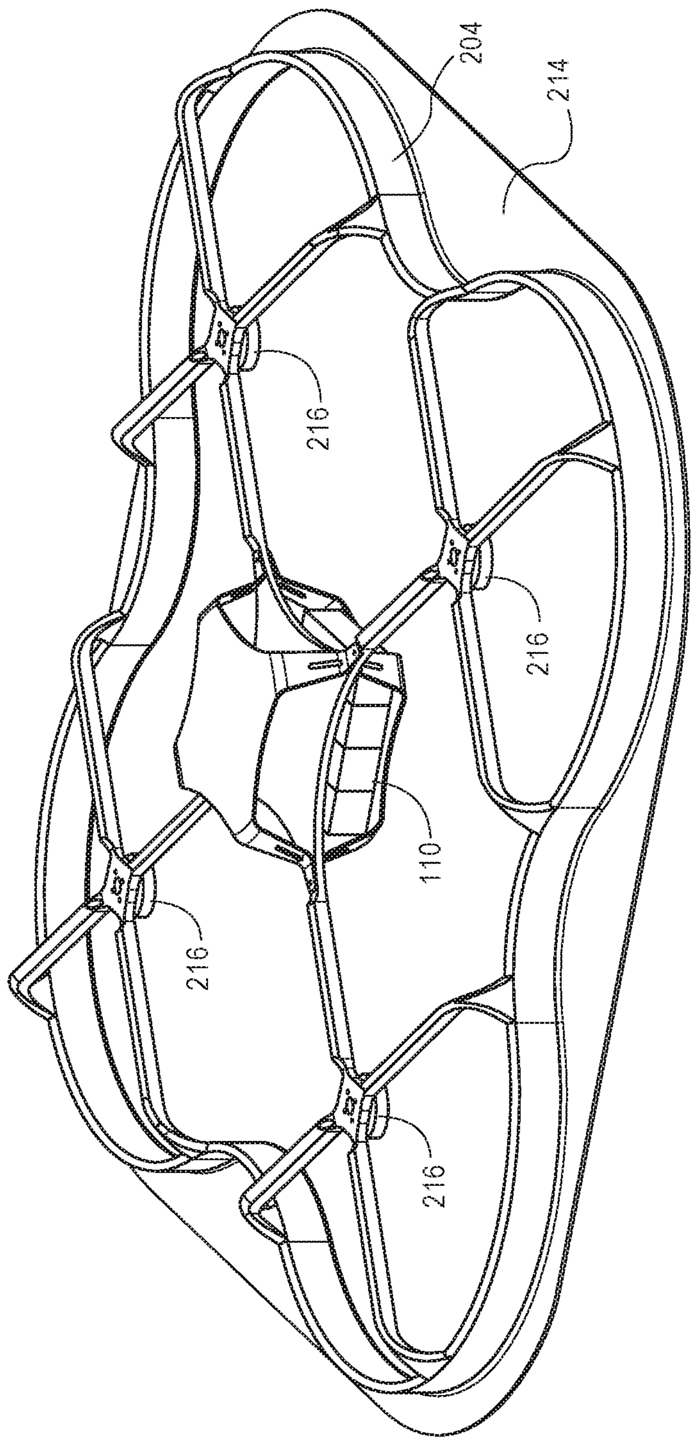
FIG. 2 depicts a view of an unmanned aerial vehicle frame, according to an implementation.

FIG. 2 is another view of the UAV frame 204, according to an implementation. In this illustration, the propellers have been removed to further illustrate the frame 204. As shown, the frame may be formed as a single unit to which components of the UAV are mounted. For example, the motors 216 are mounted to the frame and the UAV control system 110 is mounted to the frame 204. The frame is designed to encompass the components of the UAV 100 and provide a protective barrier around the UAV. The lifting propellers (not shown) mount to the lifting motors 216 and fit within the perimeter protective barrier 214.

Figure 3:
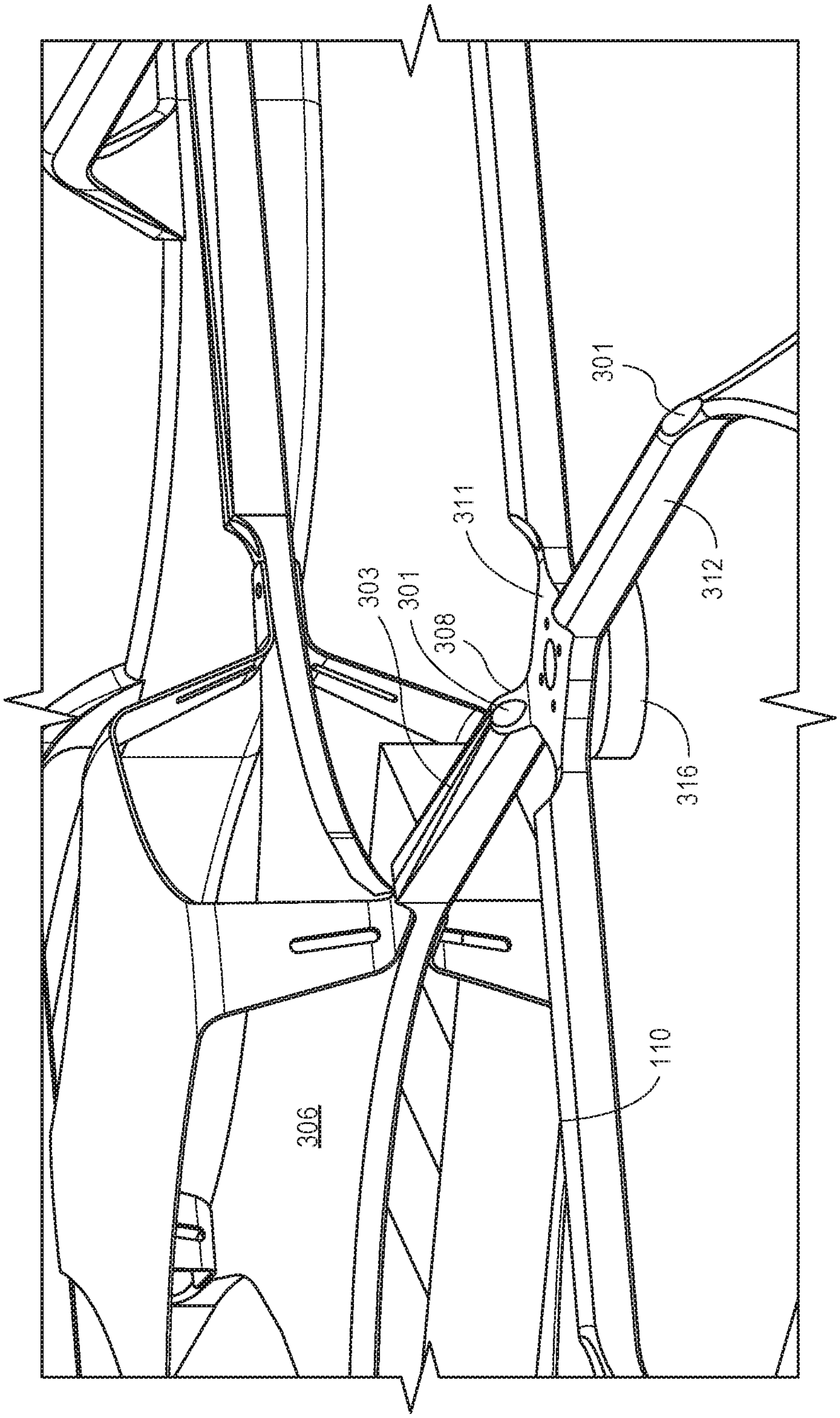
FIG. 3 depicts another view of an unmanned aerial vehicle frame, according to an implementation.

FIG. 3 depicts another view of a UAV frame, according to an implementation. The illustration in FIG. 3 provides a detailed view of a motor arm 308. The motor arm 308 is coupled at one end to the hub 306 of the UAV and the opposing end of the motor arm 308 is coupled to the motor mount 311. In this implementation, the motor arm includes a channel 301 through which one or more wires or conduits carrying electrical, optical, hydraulic, pneumatic, or mechanical signals may pass. The channel 301 may be formed as part of the frame of the UAV or may be coupled to the motor arm 308. Likewise, the channel 301 may include a slit 303 or opening to aid in the insertion or removal of wires from the channel 301. For example, the motor wires that pass from the motor 316 to the UAV control system 110 may be passed through the channel 301 so that the wires remain secured to the UAV.

While the example of FIG. 3 describes the channel 301 as part of or mounted to the top or upper side of the motor arm 308, in other implementations the channel may be mounted to other surfaces (e.g., sides) of the motor arm 308. Likewise, in some implementations, there may be multiple channels attached to one or more of the motor arms 308. In still other implementations, channels 301 may likewise be coupled to one or more of the support arms 312. For example, wires from one or more components coupled to the perimeter protective barrier (not shown in FIG. 3) may be passed through the channel 301 of the support arm 312 and the channel 301 of the motor arm 308 so that the wires remain secured to the UAV. Additionally, in yet another alternative implementation, one or more channels 301 may pass through motor arms 308.

Figure 4:
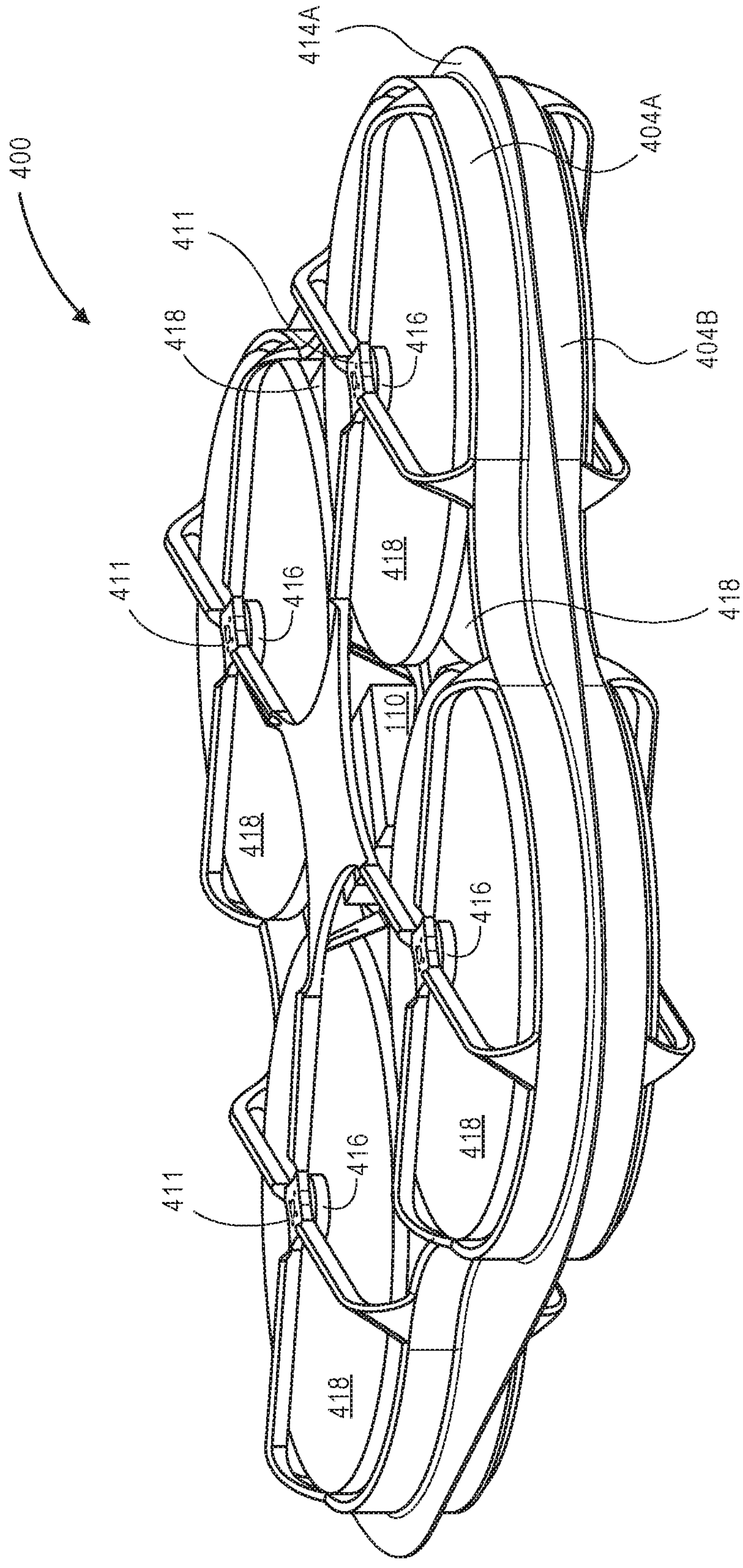
FIG. 4 depicts a view of another unmanned aerial vehicle configuration, according to an implementation.

FIG. 4 depicts a view of another UAV configuration, according to an implementation. The UAV 400 illustrated in FIG. 4 includes eight lifting motors 416 and corresponding lifting propellers 418. In this configuration, the UAV 400 is formed of two matching frames 404A, 404B that are coupled together in a stacked or clamshell configuration. In this implementation, each frame is a single carbon fiber frame that may be removably coupled together by joining the horizontal components 414A of the perimeter protective barriers of the frames 404. For example, the frames may be screwed, bolted, riveted, welded, fused or otherwise fastened together. In other implementations, the frame 404 may be a single body configuration.

The frames 404A and 404B may have the same or similar components and/or configuration to the frame 104 discussed above with respect to FIG. 1. For example, each frame 404 may include a hub, motor arms, motor mounts, support arms, and a perimeter protective barrier. Each frame 404 may have four lifting motors 416 and corresponding lifting propellers 418 mounted to respective motor mounts 411 of the frame 404. Likewise, the UAV control system 110 may be mounted to one or more of the frames 404 and one or more components (e.g., antenna, camera, gimbal, radar, distance determining elements) may be mounted to one or more of the frames, as discussed above. However, in the illustrated UAV 400, one UAV control system 110 may be configured to control the UAV 400 and each of the eight lifting motors 416 and corresponding lifting propellers.

By coupling the frames 404 together or by forming a single frame, all of the motors and propellers of the UAV 400 are surrounded by the frame 404. Likewise, in some implementations, the frame 404 may include a permeable material (e.g., wire, mesh) that surrounds the outer perimeter formed by the frame 404 to inhibit access to the propellers 418 from above or below the UAV 400.

Figure 5:
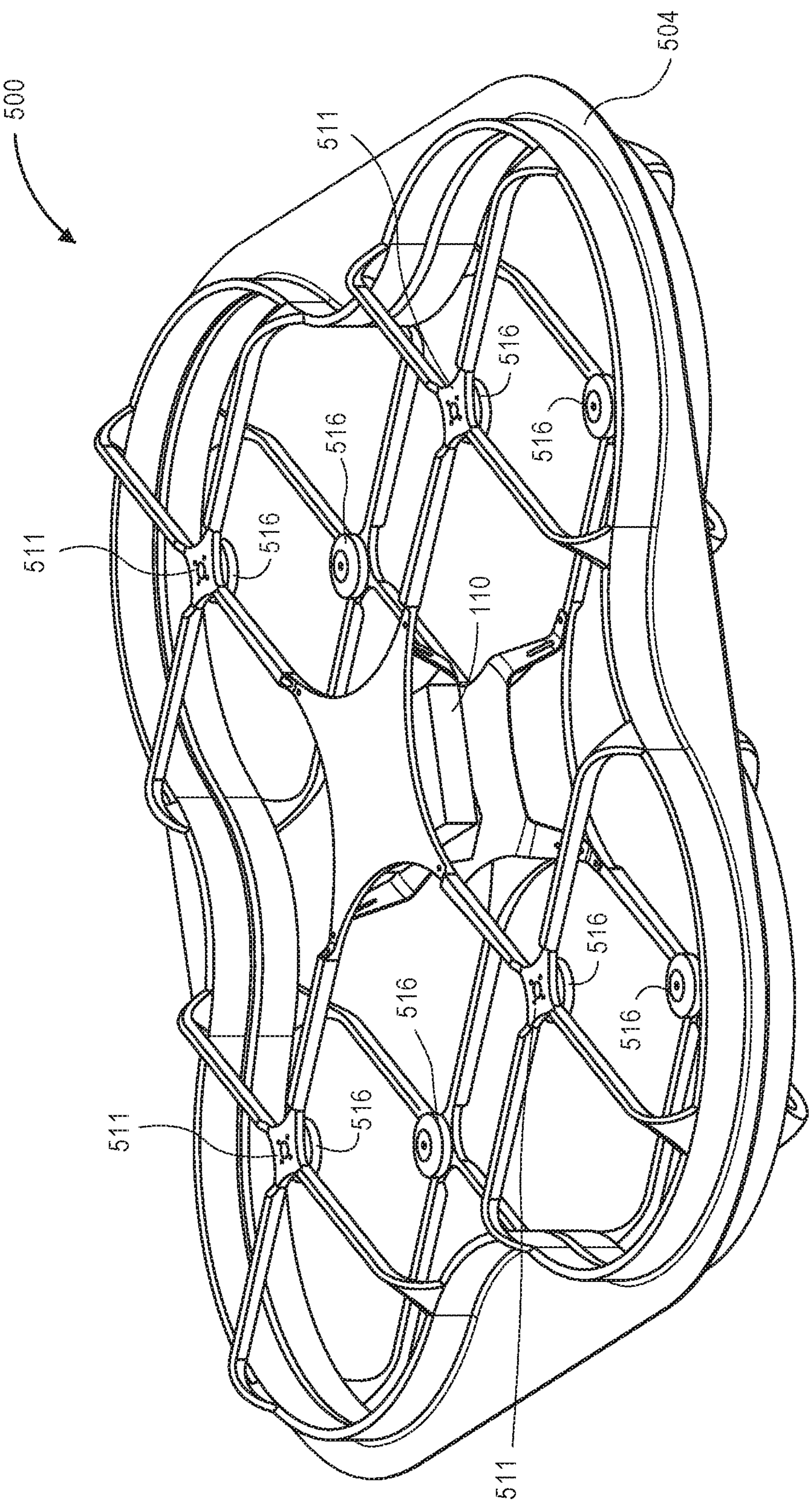
FIG. 5 depicts a view of another unmanned aerial vehicle frame, according to an implementation.

FIG. 5 depicts a view of another UAV 500 frame 504, according to an implementation. In this illustration, the propellers have been removed to further illustrate the frame 504. As shown, the frame 504 may be formed using two matching frames that are mounted or joined together so that the lifting motors and lifting propellers are within the frame 504 of the UAV 500. As discussed above, the frame 504 provides both a protective barrier and structural support for mounting of UAV 500 components. For example, the lifting motors 516 are mounted to the inner portions of the motor mounts 511 of the frame 504 and the UAV control system 110 is mounted to the frame 504. The frame is designed to encompass the components of the UAV 500 and provide a protective barrier around the UAV 500. The lifting propellers (not shown) mount to the lifting motors 516 and fit within the frame 504.

Figure 6:
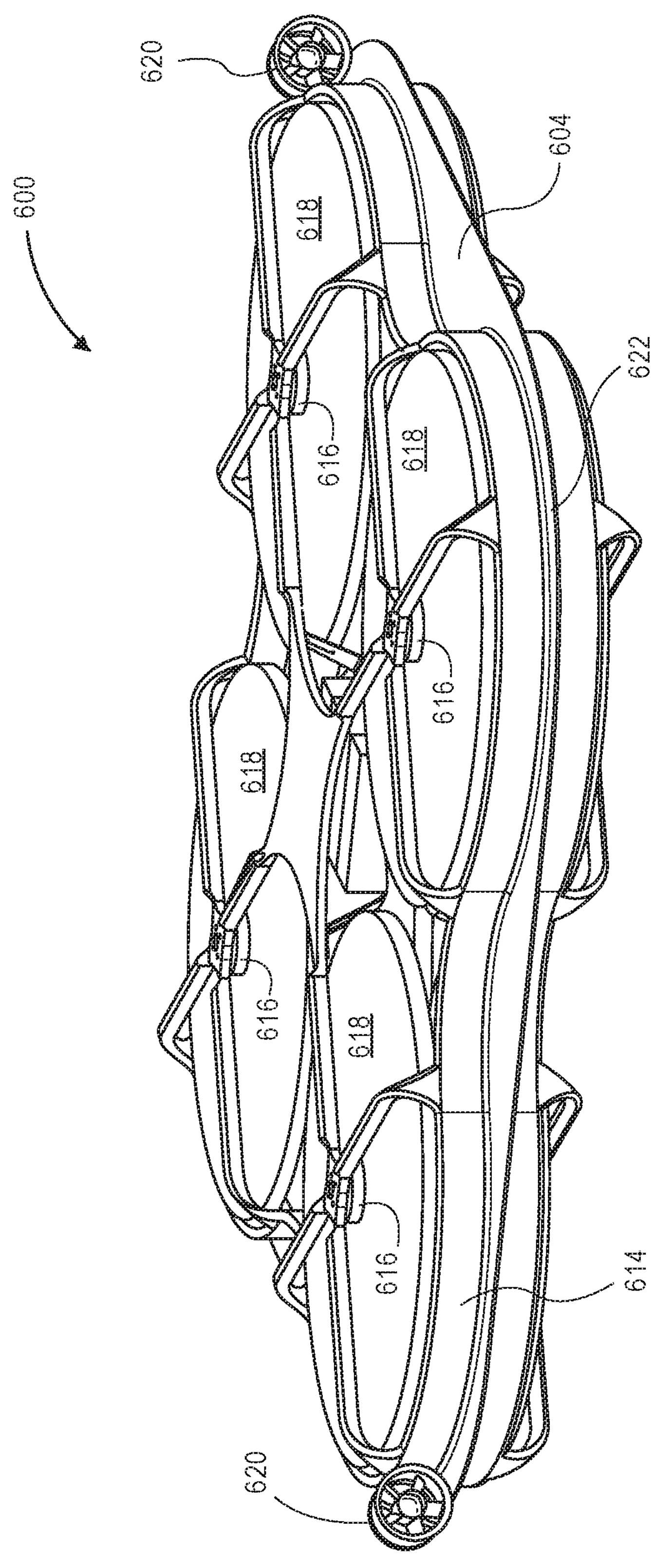
FIG. 6 depicts a view of another unmanned aerial vehicle configuration, according to an implementation.

FIG. 6 depicts a view of another UAV 600 configuration, according to an implementation. The UAV 600 is similar to the eight-propeller UAVs 400, 500 discussed above with respect to FIGS. 4 and 5. For example, in this illustration, the UAV 600 includes a frame 604 to which eight lifting motors 616 and corresponding lifting propellers 618 are mounted. Likewise, the frame 604 provides a protective barrier around each of the lifting motors 616, lifting propellers 618 and other components of the UAV 600.

In addition to the lifting motors 616 and lifting propellers 618, the UAV 600 includes two pushing motor housings 620, each of which include a pushing motor and pushing propeller. The pushing motor housings 620 are mounted to the perimeter protective barrier 614 of the frame 604. The pushing motor housing 620 may be aerodynamically shaped and configured to encase the pushing motor and/or pushing propeller. The pushing motor and the pushing propeller may be the same or different than the lifting motors 616 and lifting propellers 618. For example, in some implementations, the pushing motor may be a Tiger U-8 motor and the pushing propeller may have a dimension of eighteen inches. In other implementations, the pushing motor and pushing propeller may be formed with the pushing motor housing 620 as a single unit, such as a ducted fan system. In some implementations, the pushing propeller may have a smaller dimension than the lifting propellers. In other implementations, the pushing motors may utilize other forms of propulsion to propel the UAV. For example, fans, jets, turbojets, turbo fans, jet engines, internal combustion engines, and the like may be used (either with propellers or other devices) as the pushing motors.

The pushing motors and pushing propellers may be oriented at approximately ninety degrees with respect to the frame 604 of the UAV 600 and utilized to increase the efficiency of flight that includes a horizontal component. For example, when the UAV 600 is traveling in a direction that includes a horizontal component, the pushing motors may be engaged to provide horizontal thrust force via the pushing propellers to propel the UAV 600 horizontally. As a result, the speed and power utilized by the lifting motors 616 may be reduced. Alternatively, in selected implementations, the pushing motor may be oriented at an angle greater or less than ninety degrees with respect to the frame 604 to provide a combination of pushing and lifting thrust.

Utilizing two pushing motors and pushing propellers mounted on opposite sides of the UAV 600, as illustrated in FIG. 6, the UAV has an orientation during horizontal flight. Specifically, the UAV 600, when propelled horizontally using the pushing motors and propellers alone or in combination with the lifting motors 616 and lifting propellers 618, will orient and travel with the leading edge 622 oriented in the direction of travel. Additionally, utilizing two pushing motors as shown in FIG. 6, rotation of the UAV 600 in the horizontal plane (i.e., yaw) may be adjusted by providing a thrust differential between the two pushing motors. In some implementations, an airfoil or wing may likewise be mounted to the UAV 600 in accordance with the direction of travel to provide additional lift and increased efficiency to the UAV 600.

While the example discussed herein with respect to FIG. 6 illustrates a UAV with eight lifting motors and corresponding lifting propellers being used with two pushing motors and corresponding pushing propellers, in other implementations fewer or additional lifting motors and corresponding lifting propellers may be used in conjunction with one or more pushing motors and pushing propellers. For example, one or more pushing motors and corresponding pushing propellers may be mounted to a UAV that includes four lifting motors and corresponding lifting propellers, such as the UAV 100 discussed above with respect to FIG. 1. In other implementations, more or fewer pushing motors and/or pushing propellers may be utilized.

Figure 7:
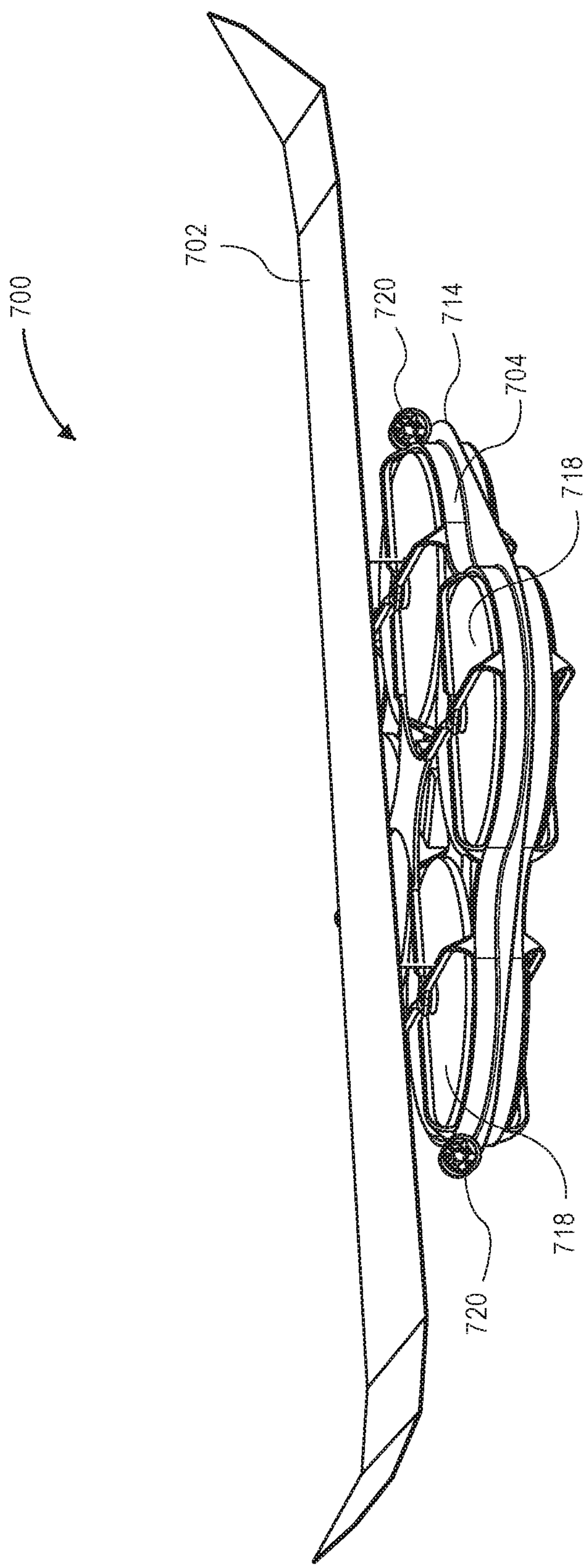
FIG. 7 depicts another view of an unmanned aerial vehicle configuration, according to an implementation.

FIG. 7 depicts another view of a UAV 700, according to an implementation. In the example illustrated in FIG. 7, the UAV 700 includes a wing 702 coupled to the frame 704 of the UAV 700. The wing 702 may be formed of any suitable material such as, but not limited to, carbon fiber, aluminum, fabric, plastic, fiberglass, wood, etc. The wing 702 may be coupled to the top of the frame 704 and positioned above the pushing motor housings 720 that include the pushing motors and pushing propellers.

The wing is designed to have an airfoil shape to provide lift to the UAV 700 as the UAV 700 moves horizontally. In some implementations, utilizing the pushing motors and the pushing propellers in conjunction with the wing 702, when the UAV 700 is moving in a direction that includes a horizontal component, the rotational speed of the lifting motors and lifting propellers 718 may be reduced or eliminated as the wing 702 may provide lift and keep the UAV 700 airborne when thrust in a horizontal direction by the pushing motors and pushing propellers is applied. In implementations where the wing 702 includes flaps and/or ailerons, the pitch, yaw and roll of the UAV 700 may be controlled using the flaps and/or ailerons alone or in combination with the lifting motors and lifting propellers 718 and/or the pushing motors and pushing propellers. If the wing 702 does not include flaps and/or ailerons, the lifting motors and lifting propellers 718 and/or the pushing motors and pushing propellers may be utilized to control the pitch, yaw, and/or roll of the UAV 700 during flight. In some implementations, the wing 702 may be configured to rotate or pivot about the frame 704 of the UAV 700 to reduce drag when the UAV 700 is moving in a direction that includes a vertical component.

The UAV 700 may be configured with eight lifting propellers and one or more pushing motors and pushing propellers, as shown, or may have a different configuration. In another configuration, the wing may be mounted to a UAV that includes eight lifting motors and corresponding lifting propellers but no pushing motors or pushing propellers. In another example, the UAV 700 may include a wing 702 mounted to a UAV with four lifting propellers and motors, such as the UAVs 100, 200 discussed above with respect to FIGS. 1 and 2. In still another example, the UAV may have four lifting motors and propellers and one or more pushing motors and pushing propellers, in conjunction with a wing 702.

Still further, while the UAV 700 illustrates a single wing extending across the top of the UAV 700, in other implementations, additional wings and/or different configurations of wings may be utilized. For example, in one implementation, a wing may extent horizontally from the perimeter protective barrier 714 on either side of the UAV 700. In another implementation, a front wing may extend from either side of the front of the perimeter protective barrier 714 and a larger rear wing may extend from either side of the rear of the perimeter protective barrier 714.

Figure 8:
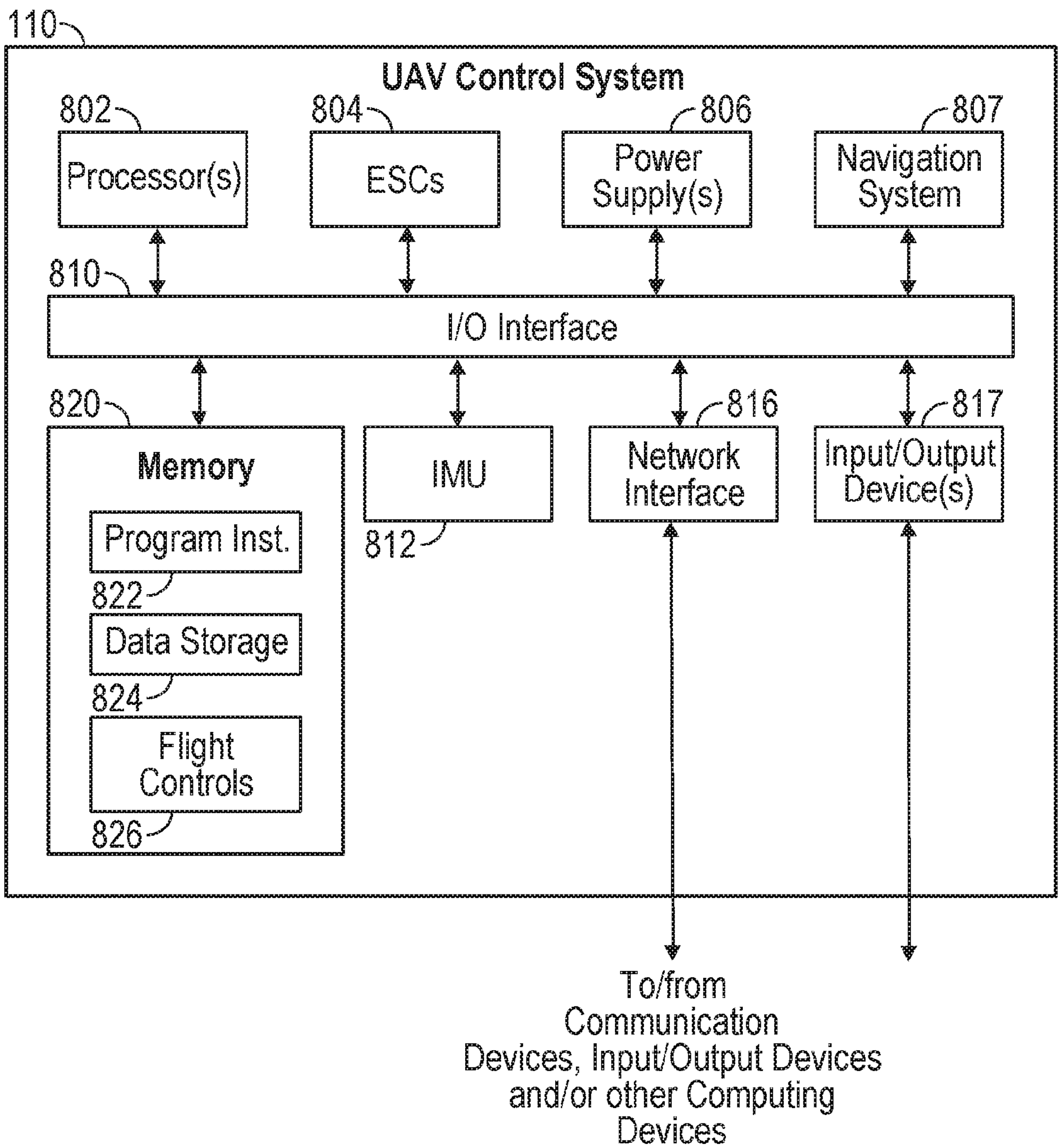
FIG. 8 is a block diagram of an illustrative implementation of an unmanned aerial vehicle control system that may be used with various implementations.

FIG. 8 is a block diagram illustrating an example UAV control system 110. In various examples, the block diagram may be illustrative of one or more aspects of the UAV control system 110 that may be used to implement the various systems and methods discussed herein and/or to control operation of the UAVs described herein. In the illustrated implementation, the UAV control system 110 includes one or more processors 802, coupled to a memory, e.g., a non-transitory computer readable storage medium 820, via an input/output (I/O) interface 810. The UAV control system 110 may also include electronic speed controls 804 (ESCs), power supply modules 806, a navigation system 807, and/or an inertial measurement unit (IMU) 812. In some implementations, the IMU may be incorporated into the navigation system 807. The UAV control system 110 may also include a payload engagement controller (not shown), a network interface 816, and one or more input/output devices 817.

In various implementations, the UAV control system 110 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths, flight control parameters, component adjustment information, center of gravity information, and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 820 as program instructions 822, data storage 824 and flight controls 826, respectively. In other implementations, program instructions, data and/or flight controls may be received, sent or stored upon different types of computer-accessible media, such as non-transitory media, or on similar media separate from the non-transitory computer readable storage medium 820 or the UAV control system 110. Generally speaking, a non-transitory, computer readable storage medium may include storage media or memory media such as magnetic or optical media, e.g., disk or CD/DVD-ROM, coupled to the UAV control system 110 via the I/O interface 810. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 817. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The ESCs 804 communicate with the navigation system 807 and/or the IMU 812 and adjust the rotational speed of each lifting motor and/or the pushing motor to stabilize the UAV and guide the UAV along a determined flight path. The navigation system 807 may include a GPS, indoor positioning system (IPS), IMU or other similar system and/or sensors that can be used to navigate the UAV 100 to and/or from a location. The payload engagement controller communicates with the actuator(s) or motor(s) (e.g., a servo motor) used to engage and/or disengage items.

The network interface 816 may be configured to allow data to be exchanged between the UAV control system 110, other devices attached to a network, such as other computer systems (e.g., remote computing resources), and/or with UAV control systems of other UAVs. For example, the network interface 816 may enable wireless communication between the UAV that includes the control system 110 and a UAV control system that is implemented on one or more remote computing resources. For wireless communication, an antenna of an UAV or other communication components may be utilized. As another example, the network interface 816 may enable wireless communication between numerous UAVs. In various implementations, the network interface 816 may support communication via wireless general data networks, such as a Wi-Fi network. For example, the network interface 816 may support communication via telecommunications networks, such as cellular communication networks, satellite networks, and the like.

Input/output devices 817 may, in some implementations, include one or more displays, imaging devices, thermal sensors, infrared sensors, time of flight sensors, accelerometers, pressure sensors, weather sensors, cameras, gimbals, landing gear, etc. Multiple input/output devices 817 may be present and controlled by the UAV control system 110. One or more of these sensors may be utilized to assist in landing as well as to avoid obstacles during flight.

As shown in FIG. 8, the memory may include program instructions 822, which may be configured to implement the example routines and/or sub-routines described herein. The data storage 824 may include various data stores for maintaining data items that may be provided for determining flight paths, landing, identifying locations for disengaging items, engaging/disengaging the pushing motors, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 110 is merely illustrative and is not intended to limit the scope of the present disclosure. In particular, the computing system and devices may include any combination of hardware or software that can perform the indicated functions. The UAV control system 110 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 110. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the UAV control system 110 may be transmitted to the UAV control system 110 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An unmanned aerial vehicle ("UAV") frame, comprising:
- a hub;
- a first motor arm extending from the hub in a first direction;
- a second motor arm extending from the hub in a second direction;
- a third motor arm extending from the hub in a third direction;
- a fourth motor arm extending from the hub in a fourth direction; and
- a perimeter protective barrier coupled to at least one of the first motor arm, the second motor arm, the third motor arm, or the fourth motor arm; and
- wherein the hub, the first motor arm, the second motor arm, the third motor arm, the fourth motor arm, and the perimeter protective barrier are formed as a monolithic uni-body; and
- wherein the perimeter protective barrier completely surrounds the hub, the first motor arm, the second motor arm, the third motor arm, and the fourth motor arm, and wherein the perimeter protective barrier includes a vertical component extending downward from the first motor arm, the second motor arm, the third motor arm, and the fourth motor arm.

2. The UAV frame of claim 1, further comprising a first pushing motor coupled to the monolithic uni-body and configured to provide horizontal propulsion to the UAV frame.

3. The UAV frame of claim 1, wherein the first motor arm includes an inner core.

4. An unmanned aerial vehicle (UAV), comprising:
- a monolithic uni-body frame including:
  - a hub positioned near a center of the UAV;
  - a plurality of motor arms, each motor arm having a first end and a second end, each first end coupled to the hub; and
  - a protective perimeter barrier completely surrounding the hub and the plurality of motor arms, the protective perimeter barrier including a vertical component extending away from the plurality of motor arms;
- a plurality of motors coupled to respective motor arms of the monolithic uni-body frame; and
- a plurality of propellers, each propeller coupled to a motor of the plurality of motors, wherein the plurality of propellers is encompassed by the protective perimeter barrier of the monolithic uni-body frame.

5. The UAV of claim 4, wherein the UAV includes at least eight motors, each motor coupled to a respective motor arm of the monolithic uni-body frame.

6. The UAV of claim 4, wherein the monolithic uni-body frame includes:

a plurality of motor mounts, each motor mount coupled to the second end of one of the plurality of motor arms; and a plurality of support arms, each support arm having a third end and a fourth end, each third end coupled to a motor mount of the plurality of motor mounts.

7. The UAV of claim 4, wherein the monolithic uni-body frame further comprises:

a channel coupled to a first motor arm of the plurality of motor arms and configured to receive a wire.

8. The UAV of claim 7, wherein the channel is formed as part of the first motor arm.

9. The UAV of claim 6, wherein the fourth ends of at least a portion of the plurality of support arms are coupled to the protective perimeter barrier.

10. The UAV of claim 4, wherein a first motor of the plurality of motors is positioned to provide horizontal thrust to the UAV.

11. An unmanned aerial vehicle ("UAV"), comprising:

a frame including a first monolithic frame component and a second monolithic frame component, the frame including:

a hub positioned near a center of the UAV;

a plurality of motor arms, each motor arm having a first end and a second end, each first end coupled to the hub; and a protective perimeter barrier completely surrounding the hub and the plurality of motor arms, the protective perimeter barrier including a vertical component extending away from the plurality of motor arms;

a first plurality of motors coupled to the first monolithic frame component;

a first plurality of propellers, each of the first plurality of propellers coupled to a motor of the first plurality of motors;

a second plurality of motors coupled to the second monolithic frame component;

a second plurality of propellers, each of the second plurality of propellers coupled to a motor of the second plurality of motors; and wherein the first monolithic frame component is coupled to the second monolithic frame component such that the first plurality of propellers and the second plurality of propellers are positioned within a perimeter of the frame.

12. The UAV of claim 11, further comprising:

a permeable material extending around at least a portion of the frame, the permeable material comprising at least one of screen, mesh, or wire.

13. The UAV of claim 11, further comprising:

a first pushing motor coupled to the frame and configured to provide horizontal propulsion to the UAV.

14. The UAV of claim 13, further comprising:

a first pushing propeller coupled to the first pushing motor.

15. The UAV of claim 11, further comprising:

a wing coupled to the frame, wherein the wing is configured to provide lift as the UAV is flown in a direction including a horizontal component.

16. The UAV of claim 11, wherein the first monolithic frame component is a single unit and provides structural support to the UAV.

17. The UAV of claim 11, wherein the protective perimeter barrier inhibits access from a side of the UAV to the first plurality of propellers and the second plurality of propellers.

18. The UAV of claim 11, further comprising:

at least one of an antenna, a camera, a time of flight sensor, a distance determining element, a gimbal, a Global Positioning System (GPS) receiver/transmitter, a radar, an illumination element, or a speaker coupled to the protective perimeter barrier of the frame.

19. The UAV of claim 11, wherein the first monolithic frame component and the second monolithic frame component are individually formed and coupled together.

20. The UAV of claim 11, wherein the first monolithic frame component and the second monolithic frame component are two matching halves that, upon coupling together, form the frame.

* * * * *